United States Patent
Kroos et al.

(10) Patent No.: US 9,828,892 B2
(45) Date of Patent: Nov. 28, 2017

(54) DEVICE FOR PRODUCING AT LEAST ONE HOLLOW VALVE

(71) Applicant: Mahle International GmbH, Stuttgart (DE)

(72) Inventors: Peter Kroos, Rutesheim (DE); Christoph Luven, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/965,858

(22) Filed: Dec. 10, 2015

(65) Prior Publication Data

US 2016/0186621 A1  Jun. 30, 2016

(30) Foreign Application Priority Data

Dec. 11, 2014  (DE) .......................... 10 2014 225 619

(51) Int. Cl.
*F01L 3/20* (2006.01)
*B23H 7/26* (2006.01)
(Continued)

(52) U.S. Cl.
CPC ................... *F01L 3/20* (2013.01); *B23H 7/26* (2013.01); *B23H 9/14* (2013.01); *F01L 3/12* (2013.01);
(Continued)

(58) Field of Classification Search
CPC ... B21K 1/20–1/24; B23H 7/26; B23H 7/265; B23H 7/30; B23P 15/001;
(Continued)

(56) References Cited

U.S. PATENT DOCUMENTS

| | | | | |
|---|---|---|---|---|
| 1,644,021 A | * | 10/1927 | Knudsen .................. | B21K 1/22 29/888.452 |
| 1,992,245 A | * | 2/1935 | Scrimgeour ............. | B21K 1/22 251/318 |

(Continued)

FOREIGN PATENT DOCUMENTS

| | | |
|---|---|---|
| CN | 101927355 B | 2/2012 |
| DE | 69905121 T2 | 10/2003 |
| DE | 102011077198 A1 | 12/2012 |

OTHER PUBLICATIONS

English abstract for DE-102011077198.
(Continued)

*Primary Examiner* — Larry E Waggle, Jr.
*Assistant Examiner* — Tyrone V Hall, Jr.
(74) *Attorney, Agent, or Firm* — Fishman Stewart PLLC

(57) ABSTRACT

A device for producing at least one hollow valve for a gas exchange system may include at least one valve holder. The at least one valve holder may include a valve stem centring element, a valve receptacle and a valve head holder. The valve receptacle may receive a valve stem and the valve head holder may receive a valve head. A first carrier and a second carrier may be provided. The valve holder may be arranged on the first carrier. At least one cathode holder may be arranged on the second carrier. The cathode holder may include a cathode that is insertable through the first carrier via the valve stem centring element. At least one contact plate may be arranged opposite the valve head holder.

20 Claims, 2 Drawing Sheets

(51) Int. Cl.
    *F01L 3/12*     (2006.01)
    *F01L 3/14*     (2006.01)
    *B23H 9/14*     (2006.01)
    *B23H 3/00*     (2006.01)
(52) U.S. Cl.
    CPC .................................. *F01L 3/14* (2013.01);
        *B23H 3/00* (2013.01); *F01L 2103/00* (2013.01)
(58) Field of Classification Search
    CPC .... B23P 15/002; B25B 27/24; F01L 2103/00;
        F01L 2103/01; B23Q 3/06–3/064
    See application file for complete search history.

(56)  References Cited

U.S. PATENT DOCUMENTS

| | | | | |
|---|---|---|---|---|
| 2,004,528 A | * | 6/1935 | Hedlund | B21K 1/22 251/318 |
| RE20,014 E | * | 6/1936 | Scrimgeour | B21K 1/22 123/188.3 |
| 2,093,774 A | * | 9/1937 | Colwell | F01L 3/02 123/41.16 |
| 2,365,385 A | * | 12/1944 | Booth | B25B 27/24 15/268 |
| 2,411,734 A | * | 11/1946 | Kerwin | B21K 1/22 123/188.1 |
| 2,450,797 A | * | 10/1948 | Heinrich | B23D 67/00 29/76.1 |
| 2,577,644 A | | 12/1951 | Bartlett | |
| 3,352,770 A | * | 11/1967 | Crawford | B23H 3/00 204/224 R |
| 3,421,997 A | * | 1/1969 | Williams | B23H 3/04 204/224 M |
| 3,533,926 A | * | 10/1970 | Trebichavsky | B23H 7/26 204/224 M |
| 3,696,014 A | * | 10/1972 | Goodard et al. | B23H 9/14 204/212 |
| 3,990,959 A | * | 11/1976 | Payne | B23H 9/16 204/224 M |
| 4,083,767 A | * | 4/1978 | Suslin | B23H 7/30 204/224 M |
| 4,085,025 A | * | 4/1978 | Lekarev | B23H 3/10 204/224 M |
| 4,093,530 A | * | 6/1978 | Suslin | B23H 3/10 204/224 M |
| 4,104,503 A | * | 8/1978 | Di Piazza | B23H 9/14 204/224 M |
| 4,430,180 A | * | 2/1984 | Shimizu | B23H 1/10 204/224 M |
| 4,941,955 A | * | 7/1990 | Schuster | B23H 9/00 204/224 M |
| 6,221,235 B1 | * | 4/2001 | Gebhart | B22D 29/002 204/280 |
| 6,231,748 B1 | | 5/2001 | Agafonov et al. | |
| 2012/0228538 A1 | * | 9/2012 | Yoshimura | B21C 23/183 251/366 |

OTHER PUBLICATIONS

Koenig, Wilfried, "Fertigungsverfahren", Studium und Praxis, 23, Aug. 1979.
German Search Report for DE-102014225619.4, dated Dec. 10, 2015.
English Abstract for CN101927355B.
European Search Report for EP15190711 dated May 3, 2016.

* cited by examiner

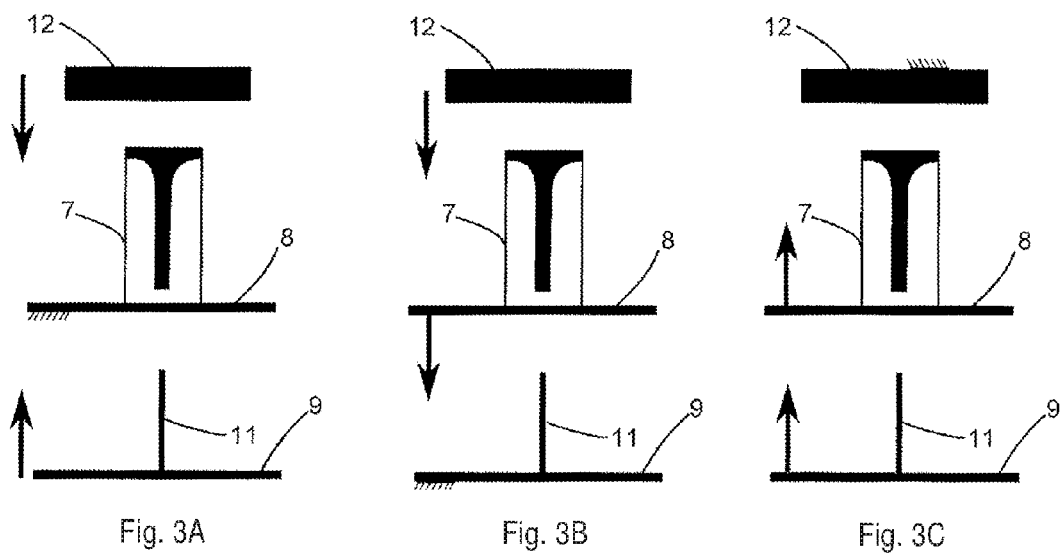

DEVICE FOR PRODUCING AT LEAST ONE HOLLOW VALVE

CROSS-REFERENCE TO RELATED APPLICATIONS

This application claims priority to German Patent Application No. 10 2014 225 619.4, filed Dec. 11, 2014, the contents of which are hereby incorporated by reference in their entirety.

TECHNICAL FIELD

The present invention relates to a device for producing at least one hollow valve for gas exchange, in particular for internal combustion engines.

BACKGROUND

Hollow valves for internal combustion engines have been part of the prior art for a long time and, owing to the cooling effect, make possible a longer service life and improved performance of the internal combustion engine. In addition to simple heat dissipation via a valve seat ring in the cylinder head, such hollow valves also offer the possibility of accommodating a cooling medium, for example sodium, in the cavity thereof, as a result of which advantages can be achieved in particular with use as an outlet valve. Sodium melts at 97.5 degrees Celsius and is also a very good conductor of heat, the sodium becoming liquid owing to the operating temperature of the internal combustion engine and then being moved to and fro in the stem by the mass forces. This is also referred to as a "shaker effect". The coolant, that is, usually the sodium, transports some of the heat produced during combustion from the valve disc and in particular from a highly loaded hollow throat region into the stem region and can be conducted away from there via the valve guide. The temperatures at the valve disc can be reduced by 80° C. to 150° C. by means of sodium-cooled hollow valves. A positive side effect is also that such a hollow valve is more lightweight than a valve with a solid valve stem, despite the sodium filling.

In addition to the actual bore in the valve stem, however, a cavity in the valve disc should be greater in order to be able to cool the highly loaded regions of the valve disc (for example hollow throat region) better. What is known as the ECM method (electrochemical machining) is usually used to do this, in which a cathode is introduced into the bore of the valve stem and emits electrons via an electrolyte to the workpiece, in this case the hollow valve, which acts as an anode.

The disadvantage of the known hollow valves is however their comparatively complex production, since extremely precise guiding and positioning of the cathode is necessary to produce the cavity provided in the valve disc or valve head.

SUMMARY

The present invention is therefore concerned with the problem of specifying a device for the production of at least one hollow valve for gas exchange, by means of which device particularly precise and at the same time economical production of such a hollow valve is possible.

This problem is solved according to the invention by the subject matter of independent Claim(s). Advantageous embodiments form the subject matter of the dependent claims.

The present invention is based on the general concept of specifying a multi-part device for the production of at least one hollow valve for gas exchange, in particular for an internal combustion engine, with which both the hollow valve to be machined is reliably fixed during machining and extremely precise guiding of the cathode is possible. Furthermore, a fully machined hollow valve can be replaced by a not yet machined hollow valve comparatively simply, resulting in particularly economical production. The device according to the invention has a valve holder, consisting of a valve stem centring means, a valve receptacle and a valve head holder, the valve receptacle fitting a valve stem to be held and the valve head holder fitting a valve head to be held. The valve holder then allows the hollow valve that is to be machined to be held in a gravity-induced manner, since the valve head holder is arranged at the top and thus allows the hollow valve that is to be machined to be introduced from above and fixed in a simple manner. The valve holder is arranged by means of its valve stem centring means on a first carrier, whereas at least one cathode holder is fastened to a second carrier arranged therebelow, said cathode holder having a cathode, which can be introduced through the first carrier, via the valve stem centring means into a bore in the hollow valve. Furthermore, the device according to the invention has at least one contact plate opposite the valve head holder. The machining of the hollow valve according to the invention to produce the enlarged cavity in particular in the valve head takes place as follows: First, the hollow valve to be machined is placed upside down from above into the valve holder until its valve head (valve disc) rests against the valve head holder. Then either the first carrier is moved against the contact plate or else the contact plate is moved in the direction of the first carrier until the contact plate comes into contact with the hollow valve(s) held in the valve holder. In the following method step, the contact plate can be pressed further in the direction of the first carrier, as a result of which the distance between the contact plate and the first carrier does not change, but the distance between the first and second carriers does. The reduction in the distance between the first and second carriers in turn causes the cathode arranged on the second carrier to be guided through the first carrier via the valve stem centring means into the bore in the hollow valve. If the cathode is introduced so far that it has achieved the hollow valve to be machined, an electrolyte is also supplied and the electrochemical machining can begin. In the process, the cathode is sealed off from the valve stem centring means by a seal. If the desired enlarged cavity in the valve head of the hollow valve to be produced is produced, for example the contact plate is retracted again, as a result of which the cathode is moved out of the bore in the hollow valve and then contact is broken between the contact plate and the valve head of the hollow valve to be machined. The fully machined hollow valve can then be simply removed from the valve holder.

The contact plate is expediently formed at least partially from an electrically conductive material, in particular stainless steel or copper. Both embodiments allow optimal electrical conduction between the hollow valve to be machined and the contact plate and are furthermore corrosion-resistant, which results in a long service life.

In another advantageous embodiment of the solution according to the invention, the valve head holder is mounted such that it is resilient and axially movable with respect to the valve receptacle. This makes it possible in particular to compensate tolerances and to fix the hollow valve in the valve holder in a low-stress manner.

In an advantageous development of the solution according to the invention, the valve stem centring means has an electrolyte supply and the cathode holder has an electrolyte discharge. Alternatively, it is also conceivable for the valve stem centring means to have an electrolyte discharge and the cathode holder to have an electrolyte supply. These are equivalent but differently designed embodiments of the electrolyte supply and discharge. To reliably prevent the electrolyte escaping, the cathode is sealed off from the valve stem centring means by means of a seal. It is thereby possible to apply a pressure of up to 15 bar to the electrolyte.

All the embodiments have in common that the valve holder or at least the valve head holder thereof and/or the cathode holder can be replaced comparatively simply, as a result of which the device according to the invention can be adapted flexibly and simply to a wide variety of hollow valves to be machined. Furthermore, it is of course also conceivable for the device according to the invention to be used to machine not only a single hollow valve but also a plurality of hollow valves at the same time, which in particular helps to reduce production costs. It is also conceivable for the valve to be machined in the device not only in a suspended manner but also standing or lying in a valve receptacle, but the suspended position described here is particularly advantageous.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

BRIEF DESCRIPTION OF THE DRAWINGS

Preferred exemplary embodiments of the invention are shown in the drawings and are explained in more detail in the description below, the same reference symbols referring to the same or similar or functionally equivalent components.

In the figures.

DETAILED DESCRIPTION

Figure 1:
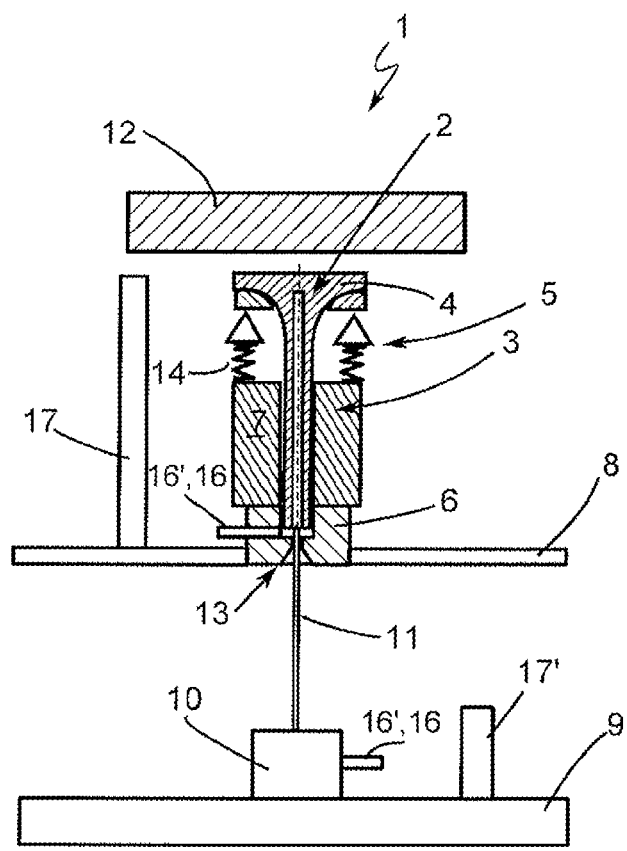
FIG. 1 schematically shows a sectional diagram through a device according to the invention for producing at least one hollow valve, FIG. 2 schematically shows a detail of FIG. 1 in the region of a valve steam centring means, FIG. 3A schematically shows a device according to the invention with a movable contact plate and a movable second carrier, the first carrier and with it the valve receptacle being fixed, FIG. 3B schematically shows a device according to the invention with a movable contact plate and a movable first carrier, the second carrier and with it the cathode being fixed, FIG. 3C schematically shows a device according to the invention with movable first and second carriers.

According to FIG. 1, a device 1 according to the invention for producing at least one hollow valve 2 for gas exchange, in particular for internal combustion engines, has at least one valve holder 3, in this case two valve holders 3. The hollow valve 2 to be machined is inserted upside down in the valve holder 3 until its valve head 4 rests in a valve head holder 5. Of course, it is alternatively also conceivable for the hollow valve 2 to be machined in any position, in particular standing or lying, and not only in a suspended manner. The valve holder 3 consists of a valve stem centring means 6, a valve receptacle 7 and the said valve head holder 5, the valve receptacle 7 fitting a valve stem to be held of the hollow valve 2 and the valve head holder 5 fitting the valve head 4 to be held of the hollow valve 2. The valve holder 3 is arranged by means of its valve stem centring means 6 on a first carrier 8. Furthermore, at least one second carrier 9 is provided, on which a cathode holder 10 is arranged with a cathode 11, which can be introduced through the first carrier 8 via the valve stem centring means 6 into a bore in the hollow valve 2. Opposite the valve head holder 5, the device 1 according to the invention also has a contact plate 12, which is formed at least partially from an electrically conductive material, in particular stainless steel or copper, and therefore conducts electricity well.

Figure 2:
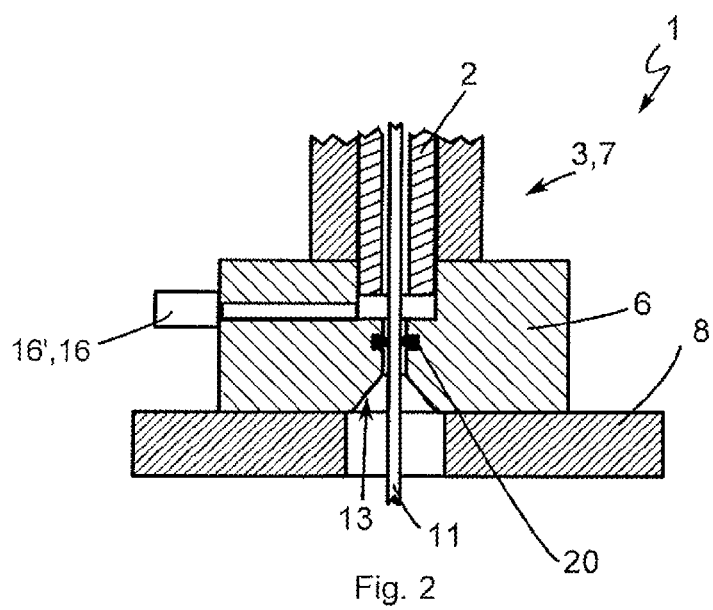

If FIG. 2 is viewed, it can be seen that the cathode 11 penetrates the valve stem centring means 6 and the first carrier 8 and at the same time has a bevel 13 for easier introduction of the cathode 11 into the bore in the hollow valve 2. The valve head holder 5 is mounted such that it is resilient and axially movable with respect to the valve receptacle 7, as a result of which an at least slight tolerance compensation is possible and the valve head holder 5 can even be used for different valve types. The resilient bearing of the valve head holder 5 with respect to the valve receptacle 7 is effected by means of a helical spring 14.

With the device 1 according to the invention, in particular a cavity in the region of the valve head 4 of the hollow valve 2 is enlarged by electrochemical machining in order to achieve improved cooling there. In addition to the cathode 11, an electrolyte is also necessary to do this, which can for example be supplied through a hollow cathode 11 and discharged via an electrolyte discharge 16 arranged in the region of the valve stem centring means 6. In this case, the valve stem centring means 6 therefore has the electrolyte discharge 16' and the cathode holder 10 has the electrolyte supply 16. Alternatively, the valve stem centring means 6 can of course have an electrolyte supply 16 and the cathode holder 10 can have an electrolyte discharge 16'. To reliably prevent the electrolyte escaping, the cathode 11 is sealed off from the valve stem centring means 6 by means of a seal 20.

In the device 1 according to the invention, the contact plate 12 is usually movable relative to the first carrier 8, at least until the contact plate 12 is brought into electrically conductive contact with the valve head 4 of the hollow valve 2 (cf. FIG. 3B). If the contact plate 12 is moved further with respect to the first carrier 8, the valve head holder 5 is pressed down, until the contact plate 12 rests against a stop 17 arranged between the contact plate 12 and the first carrier 8 (cf. FIG. 1). If the contact plate 12 is then pressed further down, the first carrier 8 moves downwards towards the second carrier 9 and causes the cathode 11 to be introduced through the valve stem centring means 6 and the first carrier 8 into the bore in the hollow valve 2. The end position is reached when the first carrier 8 rests on the stop 17' (cf. FIG. 1) or a predefined height position is reached. Actuation can take place for example by means of a pneumatic or hydraulic system or in a numerically controlled manner. The second carrier 9 is fixed. If the cathode 11 is inserted up to a predefined degree into the bore in the hollow valve 2, the electrochemical machining can take place.

FIG. 3A shows a device according to the invention 1 with a movable contact plate 12 and a movable second carrier 9, the first carrier 8 and with it the valve receptacle 7 being fixed. In this case, the contact plate 12 is therefore movable downwards relative to the first carrier 8, at least until the contact plate 12 is brought into electrically conductive contact with the valve head 4 of the hollow valve 2. Conversely, the second carrier 9 with the cathode 11 is moved from below upwards until the cathode 11 is inserted through the valve stem centring means 6 into the hollow valve 2.

FIG. 3C in turn shows a variant of the device 1 according to the invention with movable first and second carriers, whereas the contact plate 12 is fixed. In this case, therefore, the first carrier 8 is moved upwards in the direction of the contact plate 12 until the contact plate 12 is brought into electrically conductive contact with the valve head 4 of the hollow valve 2. If the first carrier is moved further with respect to the contact plate 12, the valve head holder 5 is pressed down. The second carrier with the cathode 11 is then moved upwards until the cathode is introduced through the valve stem centring means 6 and the first carrier 8 into the bore in the hollow valve 2. If the cathode 11 is inserted up to a predefined degree into the bore in the hollow valve 2, the electrochemical machining can take place.

In general, the valve stem centring means 6 accommodates the valve stem of the hollow valve 2, in particular the valve stem end, in a defined manner and aligns it relative to the cathode 11. The valve stem centring means 6 is designed as an easily replaced exchangeable part, as are for example the valve receptacle 7 and/or the valve head holder 5, in order to allow a fast exchange for different valve types to be machined. In order always to allow contact-free introduction of the cathode 11 into the bore in the hollow valve 2, an outer diameter of the cathode 11 is smaller than the bore diameter plus a bore offset (tolerance).

The device 1 according to the invention can of course be used to machine not only a single hollow valve 2 but also a plurality of hollow valves 2 in parallel at the same time, as a result of which not only extremely high quality but also economical production of the hollow valves 2 is possible.

The invention claimed is:

1. A device for producing at least one hollow valve for a gas exchange system, comprising:
   at least one valve holder, the at least one valve holder including a valve stem centring element, a valve receptacle and a valve head holder, wherein the valve receptacle is configured to receive a valve stem and the valve head holder is configured to receive a valve head;
   a first carrier and a second carrier, wherein the at least one valve holder is arranged on the first carrier via the valve stem centring element;
   at least one cathode holder arranged on the second carrier, the at least one cathode holder including a cathode insertable through the first carrier via the valve stem centring element and into a bore in the valve stem when the valve stem is received by the valve receptacle;
   at least one contact plate disposed opposite the valve head holder; and
   wherein the first carrier is arranged between the second carrier and the at least one contact plate, and wherein the at least one valve holder is disposed on the first carrier on a side facing towards the contact plate.

2. The device according to claim 1, wherein the cathode penetrates through the first carrier.

3. The device according to claim 2, wherein the valve stem centring element includes a passage receiving the cathode, further including a seal disposed in the passage sealing off the cathode from the valve stem centring element.

4. The device according to claim 2, wherein the first carrier is movable relative to the second carrier.

5. The device according to claim 2, wherein the first carrier is movable relative to the at least one contact plate.

6. The device according to claim 1, wherein the cathode is sealed off via a seal from the valve stem centring element.

7. The device according to claim 6, wherein the first carrier is fixed in position, and wherein the second carrier and the at least one contact plate are movable relative to the first carrier.

8. The device according to claim 6, wherein the valve stem centring element includes one of an electrolyte supply and an electrolyte discharge and the at least one cathode holder includes the other of the electrolyte supply and the electrolyte discharge.

9. The device according to claim 1, wherein the at least one contact plate is composed at least partially of an electrically conductive material.

10. The device according to claim 9, wherein the electrically conductive material includes at least one of stainless steel and copper.

11. The device according to claim 1, wherein the first carrier is movable relative to at least one of the second carrier and the at least one contact plate.

12. The device according to claim 11, wherein the valve head holder is movable relative to the valve receptacle.

13. The device according to claim 1, wherein the first carrier is fixed, and wherein at least one of the second carrier and the at least one contact plate is movable relative to the first carrier.

14. The device according to claim 1, wherein the valve head holder is mounted resiliently and axially movable relative to the valve receptacle with respect to a valve stem axis.

15. The device according to claim 1, wherein the at least one contact plate is movable relative to the first carrier, and further including a stop arranged between the first carrier and the at least one contact plate.

16. The device according to claim 1, wherein the first carrier is movable relative to the second carrier when the hollow valve is mounted on the at least one contact plate.

17. The device according to claim 1, wherein at least one of:
   the valve stem centring element includes an electrolyte supply and the at least one cathode holder includes an electrolyte discharge; and
   the valve stem centring element includes an electrolyte discharge and the at least one cathode holder includes an electrolyte supply.

18. The device according to claim 1, wherein the valve receptacle is configured to mount the valve stem in at least one of a suspended relationship, a standing relationship and a lying relationship.

19. A device for producing at least one hollow valve for an internal combustion engine, comprising:
   a valve holder including a valve receptacle and a valve head holder, wherein the valve receptacle is configured to receive a valve stem and the valve head holder is configured to receive a valve head;
   a first carrier arranged between a second carrier and a contact plate, wherein the valve holder is arranged on the first carrier via a valve stem centring element;
   a cathode holder arranged on the second carrier, the cathode holder including a cathode insertable through the first carrier via the valve stem centring element and into a bore of the valve stem when the valve stem is received by the valve receptacle;
   wherein the contact plate is arranged opposed to the valve head holder; and wherein the first carrier is movable relative to the contact plate.

20. A device for producing at least one hollow valve for an internal combustion engine, comprising:
- a valve holder including a valve receptacle and a valve head holder, the valve receptacle configured to receive a valve stem and the valve head holder configured to receive a valve head;
- a first carrier arranged between a second carrier and a contact plate, wherein the valve holder is arranged on the first carrier via a valve stem centring element;
- a cathode holder arranged on the second carrier, the cathode holder including a cathode insertable through the first carrier via the valve stem centring element and into a bore of the valve stem when the valve stem is received by the valve receptacle; and
- wherein the contact plate is disposed opposite to the valve head holder, and wherein the valve head holder is mounted resiliently and axially movable relative to the valve receptacle with respect to a valve stem axis.

* * * * *